United States Patent
Cowan

(10) Patent No.: US 6,804,741 B2
(45) Date of Patent: Oct. 12, 2004

(54) COHERENT MEMORY MAPPING TABLES FOR HOST I/O BRIDGE

(75) Inventor: Joe Perry Cowan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 10/050,722

(22) Filed: Jan. 16, 2002

(65) Prior Publication Data

US 2003/0135685 A1 Jul. 17, 2003

(51) Int. Cl.[7] .............................................. G06F 13/00
(52) U.S. Cl. ...................................... 710/311; 711/141
(58) Field of Search ................................ 710/306–315; 711/3, 141–146, 118–119, 122

(56) References Cited

U.S. PATENT DOCUMENTS

| | | | | |
|---|---|---|---|---|
| 5,437,017 A | * | 7/1995 | Moore et al. ................ | 709/213 |
| 5,463,739 A | * | 10/1995 | Albaugh et al. ............... | 710/6 |
| 5,586,297 A | * | 12/1996 | Bryg et al. .................. | 711/143 |
| 5,680,576 A | * | 10/1997 | Laudon ....................... | 711/145 |
| 5,784,708 A | * | 7/1998 | Bridges et al. ............. | 711/207 |
| 5,860,146 A | * | 1/1999 | Vishin et al. ............... | 711/207 |
| 6,128,684 A | * | 10/2000 | Okayama .................... | 710/109 |
| 6,430,657 B1 | * | 8/2002 | Mittal et al. ................. | 711/138 |
| 6,459,698 B1 | * | 10/2002 | Acharya ...................... | 370/392 |
| 6,513,107 B1 | * | 1/2003 | Ansari ........................... | 712/4 |
| 6,615,337 B1 | * | 9/2003 | Clark et al. ................. | 711/205 |
| 6,633,967 B1 | * | 10/2003 | Duncan ....................... | 711/207 |
| 6,636,947 B1 | * | 10/2003 | Neal et al. ................... | 711/141 |
| 6,694,417 B1 | * | 2/2004 | Liao et al. ................... | 711/170 |
| 2003/0009334 A1 | * | 1/2003 | Printz et al. ................ | 704/256 |

FOREIGN PATENT DOCUMENTS

| | | | | |
|---|---|---|---|---|
| EP | 592121 A1 | * | 4/1994 | ........... G06F/12/10 |
| JP | 2000122916 A | * | 4/2000 | ........... G06F/12/00 |

* cited by examiner

*Primary Examiner*—Paul R. Myers

(57) ABSTRACT

A bridge device for use in computer systems has a first interface to a first interconnect apparatus such as a processor bus. It also has a second interface to second interconnect apparatus such as an I/O bus. The second interconnect apparatus is of a type capable of connection to a DMA-capable peripheral device. The bridge device has address translation hardware to translate I/O virtual addresses received from the second interface into physical memory addresses for transmission onto the first interface. The address translation hardware has an associated coherency maintenance apparatus. In a particular embodiment, the address translation hardware has a translation lookaside buffer and the coherency maintenance apparatus is apparatus for snooping through the first interface, invalidating TLB entries when a page table in memory is updated.

15 Claims, 3 Drawing Sheets

COHERENT MEMORY MAPPING TABLES FOR HOST I/O BRIDGE

FIELD OF THE INVENTION

The invention relates to the field of input-output (I/O) address space mapping hardware for computer systems. In particular, the invention relates to I/O address translation devices capable of automatically maintaining coherency in computer systems having multiple DMA-capable peripherals and potentially multiple processors.

BACKGROUND OF THE INVENTION

Most modern computer systems use virtual memory addressing. These systems compute effective addresses of operands in a virtual memory space. An address translation system then maps portions of the virtual memory space to actual data storage. The actual data storage typically includes one or more swap files or partitions as well as RAM memory. The advantages of these systems are well known in the art.

Virtual memory systems typically allocate memory in discrete blocks known as pages. When a program references memory at a particular virtual address, that address is translated to determine whether the associated real memory page is in memory, or located in a swap file. If the address corresponds to data in a swap file, real memory is allocated and loaded from the swap file. When the address corresponds to data in real memory (possibly after loading memory from a swap file), the address is translated to a physical memory address in the associated page of real, physical, memory. The reference is then allowed to take place.

A subset of these modern computer systems also use virtual addressing for Input-Output (I/O) devices. In these systems, a virtual I/O address space is created for Direct Memory Access (DMA) operations. This virtual I/O address space is typically used for I/O buffers, including disk data buffers. These buffers may each comprise contiguous locations in virtual I/O address space, but may map to discontiguous locations in physical memory. Typically, DMA-capable peripherals such as disk interface adapters transfer blocks of data between themselves and memory, generating virtual I/O addresses to address the memory.

A subset of computer systems supporting virtual I/O addressing, including those supporting the InfiniBand I/O interconnect system (InfiniBand documents are available at http://www.infinibandta.org), also support Remote Direct Memory Access (RDMA) operations. In these systems, DMA operations may be initiated by peripherals that are remotely located, they may, but need not, be physically located in the same cabinet as the processor and memory. The InfiniBand architecture requires support for RDMA read, write, and atomic operations to buffers in a virtual I/O address space. The term DMA-capable herein includes RDMA-capable devices.

Such systems have hardware and software for address translation between DMA-capable I/O devices and physical memory to support virtual I/O addresses. I/O address translation of this type is a requirement of systems supporting the InfiniBand I/O architecture.

Systems supporting address translation between DMA-capable I/O devices and system memory allow for rapid and convenient dynamic allocation of memory buffers and I/O cache space. In these systems, it is possible to configure a DMA-capable I/O device, such as a disk drive, to transfer a block of data. Address translation software and hardware then allows the transfer to take place even if the block of data straddles multiple discontinuous pages of real memory.

An I/O adapter having address translation capability is described in U.S. Pat. No. 5,784,708, hereinafter the '708 patent, the disclosure of which is hereby incorporated by reference. The input-output adapter of the '708 patent incorporates an I/O Translation Lookaside Buffer (TLB). A TLB is a hardware mapping device that stores part, or all, of a page table used for address translation. Typically, a TLB stores one or more entries of the page table, thereby permitting rapid access to those page table entries, while the full page table is stored in memory. When an I/O device specifies target addresses in memory, those addresses are checked against the page table entries stored in the TLB; if a corresponding page table entry is found those addresses are translated according to the page table entry and the requested transfer occurs. If no corresponding page table entry is found, the TLB is updated from memory with the corresponding page table entry before the transfer occurs.

Modern computer systems often have multiple DMA-capable I/O devices, and may have multiple processors. These systems may have multiple I/O TLBs. It is known that page tables of such systems may change as the system operates and memory pages are allocated, moved, pushed out into swap file, fetched from swap files, and deallocated. It is also known that page tables of such systems may change as a video bitmaps are replaced with updated, alternate, bitmaps.

A TLB is considered coherent with a page table in memory if each map entry in the TLB refers to the same place in real memory or swap file as corresponding entries in the page table data in memory. Multiple TLBs are considered coherent with each other if each is coherent with the same page table in memory.

It is desirable that each I/O TLB of the system be kept coherent with its associated page table data in memory, regardless of whether each I/O TLB uses a common or a unique page table in memory.

It is known that the coherency of I/O TLBs with their associated page tables in memory can be maintained through software, and this is common practice in the art. Software maintenance of coherency can, however, consume considerable processor cycles, during which time the processor is unable to perform other useful work. It is therefore desirable to improve, indeed automate, the maintenance of TLB coherency.

Coherency is also required in cache memory of computer systems, especially in those having multiple processors. There are several known protocols for maintaining cache coherency in multiple processor cache-equipped systems. One such protocol is known as "snooping." Snooping involves having each processor cache of the system monitor a bus for cacheline accesses by other caches of the system. When a cache sees an access to a cacheline it holds, it returns or invalidates its copy of the cacheline if necessary.

Another known protocol for maintaining cache coherency is "directory-based". In these systems, a central controller maintains a cache directory, a directory of cachelines "owned" by each cache in the system; a cacheline being "owned" by a cache if that cache has a copy of associated data. All accesses of data in the system are cleared against the cache directory to ensure that "dirty" data is written to memory and to ensure that prior owning caches are invalidated as needed. This may be done by messaging each prior owning cache when ownership of a cacheline changes.

Another form of directory-based cache coherency protocol is one in which a memory system stores a cache state for each cacheline. This cache state includes information about caches owning the associated cacheline, and is maintained by a system controller. With this system, the system controller messages each prior owning cache when ownership of a cacheline changes.

While snoop-based and directory-based coherency maintenance mechanisms have historically been used to maintain cache coherency, they are not typically used to maintain coherency of address mapping hardware such as TLB's.

A bridge is a device that couples through a first port to a first computer interconnect and through a second port to a second computer interconnect. The first and second interconnect may, but need not, be of different types, and are often, but need not be, busses. Bridges transfer data between the first and second ports. For example, a typical computer system has a host bridge that couples a processor's local bus to a PCI or other I/O local bus, and perhaps a second bridge that couples the PCI bus to an ISA bus. A bridge may also couple the interconnect of a host computer to the internal interconnect of a peripheral device. For example, a peripheral device card may incorporate a bridge that couples a PCI bus and connector to an internal PCI bus, the internal PCI bus couples a processor and other devices local to the peripheral device.

In modern computer systems, a memory system may attach directly to a processor's local bus, or the memory controller and host bridge may be integrated as a single component.

Bus bridges typically include at least a first and a second interconnect interface, with state machines for transmitting and receiving data on either interconnect interface. Bus bridges typically have address window hardware, such that they respond to a particular set of addresses on the first bus interface, and to a particular set of addresses on the second bus interface. They also have buffers capable of receiving data on the first bus interface, and transmitting it on the second bus interface, and of receiving data on the second bus interface, and transmitting it on the first bus interface.

I/O address translation logic can be located in a bus bridge. Systems exist wherein I/O address translation logic is located in a host bridge, where the I/O translation logic serves to translate virtual I/O addresses received over the I/O bus into physical addresses in the memory system.

SUMMARY OF THE INVENTION

A computer system is provided with I/O address mapping hardware. In a particular embodiment, this I/O address mapping hardware is located in a host bridge. In a particular embodiment, this address mapping hardware incorporates an I/O TLB.

The address mapping hardware is provided with apparatus for maintaining coherency between its mapping entries, and a page table in memory. In a particular embodiment, this apparatus for maintaining currency includes apparatus for snooping.

In another embodiment, a host channel adapter has I/O address mapping hardware that incorporates an I/O TLB. In this embodiment, the I/O address mapping hardware cooperates with a directory-based coherency protocol, such that mappings stored in the I/O TLB are invalidated when their corresponding page table entries in memory are modified by some other cache in the system.

DETAILED DESCRIPTION OF THE EMBODIMENTS

Figure 1:
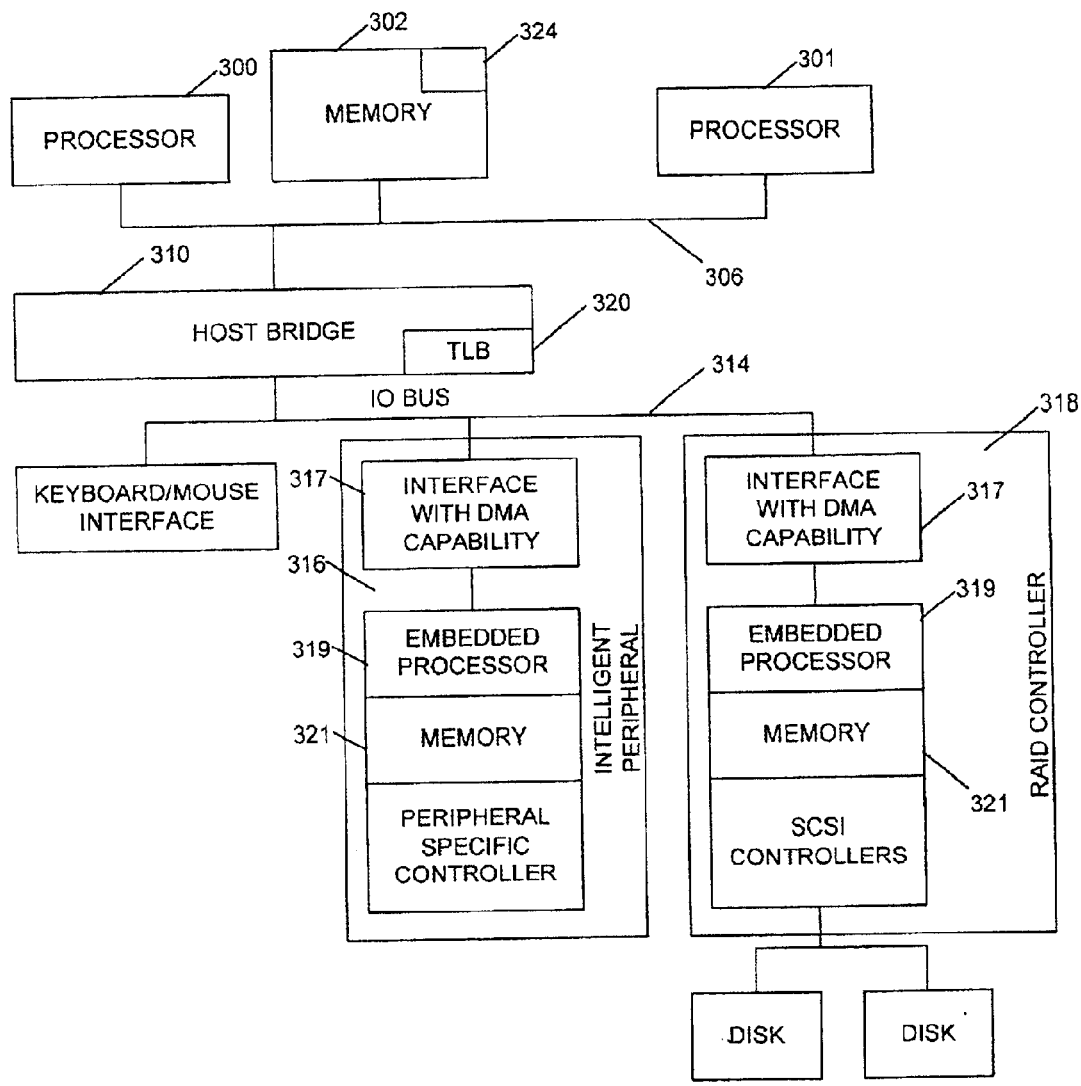
FIG. 1 is a block diagram of a system having two processors, memory, and I/O bus coupled by a host bridge, wherein I/O address translation is performed at the host bridge, and the I/O address translation logic is equipped to snoop the processor-memory (system) bus.
Figure 2:
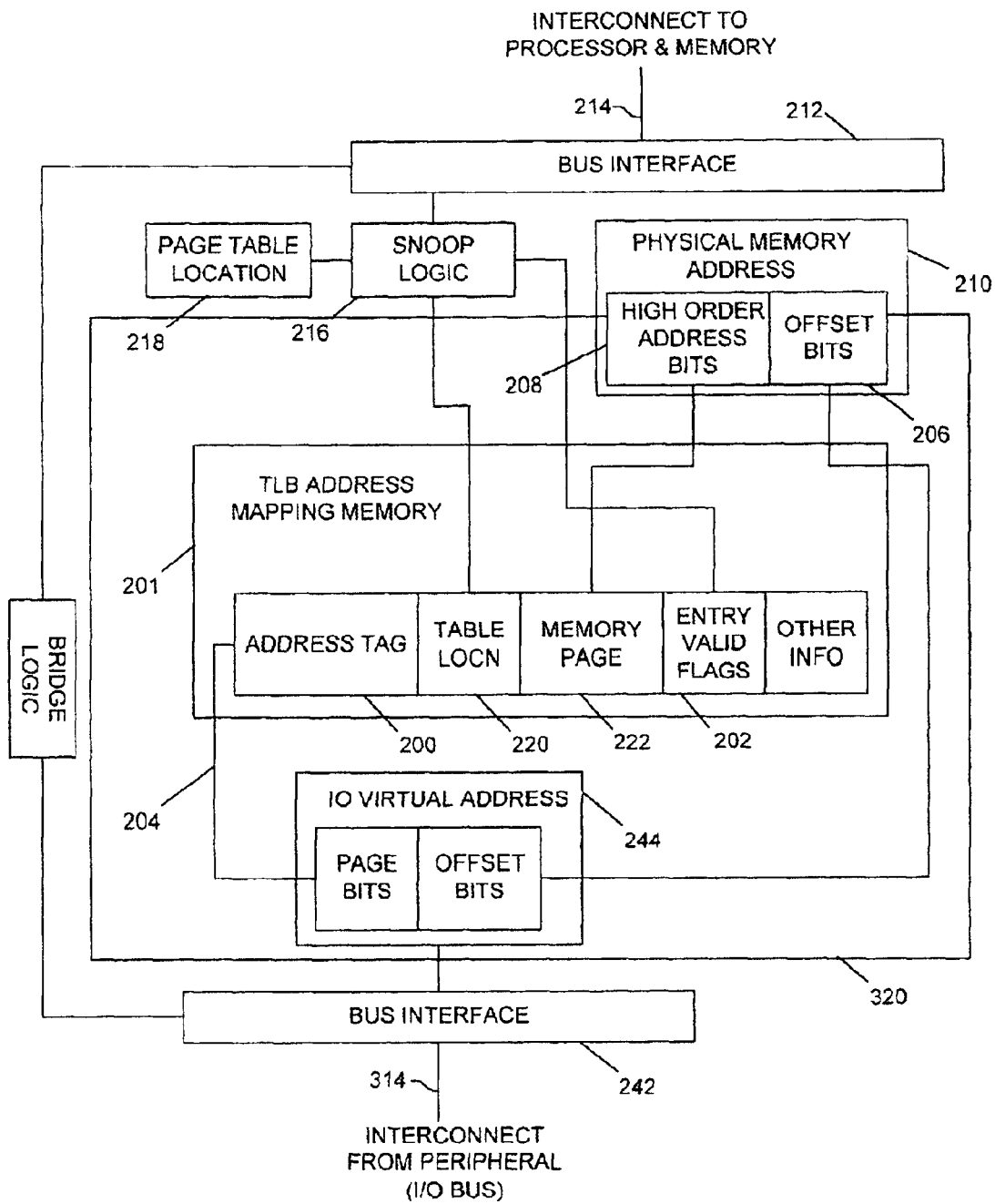
FIG. 2, a block diagram illustrating part of a bridge, detailing a portion of a Translation Lookaside Buffer (TLB) having snoop capability.

In an computer system (FIG. 1), there are one or more processors 300, 301. Each processor 300, 301 is coupled to memory 302 over a system bus 306. System bus 306 is coupled through a host bridge 310 to an I/O bus 314. I/O devices, which may include intelligent peripherals 316, 318, are coupled to the I/O bus 314. I/O address translation hardware 320 includes a TLB, and having coherency maintenance logic as described with reference to FIG. 2, is located in host bridge 310. I/O address translation hardware 320 maps I/O virtual addresses of memory references originating at peripherals 316, 318 into physical addresses in memory 302. A page table 324 exists in memory 302. The address translation hardware is updated from the page table 324 when references requiring address mappings not valid in the address translation hardware are encountered. In a particular embodiment, processor references to the page table 324 cause corresponding lines of the address translation hardware 320 to be invalidated as appropriate under a snoopy coherency protocol.

Within the TLB 320 (FIG. 1) I/O virtual addresses 244 (FIG. 2), which are generated by a DMA-capable peripheral such as intelligent peripherals 316 and 318 (FIG. 1), are received from an I/O bus 314 by an interface 242. These I/O virtual addresses 244 are separated into a group of page bits 204 and a group of offset bits 206. The page bits are looked up to find a matching address tag 200 in address mapping memory 201. Those fields of address mapping memory 201 that are searched for matches, such as the address tag 200 and table location 220, may be implemented as content addressable memory (CAM) or may be implemented as a single or multiple-way set-associative memory system as known in the art. Each entry in the TLB 320 contains an entry-valid flag 202. Each intelligent peripheral 316 and 318 has an interface with DMA capability 317, and may include an embedded processor 319, and memory 321.

The TLB 320 is capable of storing several address mapping entries in an address mapping memory 201. Each address mapping entry comprises an address tag 200 (FIG. 2) field indicating which I/O virtual page the entry applies to, a memory page 222 field indicating the associated physical memory page in host memory, an entry valid flag 202, a table location 220 field containing the cacheline address at which the particular address mapping entry is stored in a page table in host memory, and other information.

References to addresses not found in the TLB, or references to addresses having an entry-valid flag 202 marked invalid, trigger an update of the TLB from a page table in memory 302. The update may be hardware-assisted or interrupt-driven as known in the art.

For addresses having an entry-valid flag 202 marked valid, the TLB provides a physical memory page field 222, from which high order address bits 208 are read that are concatenated with the offset bits 206 to form a complete physical memory address 210. The physical memory address is then transmitted to memory 102 or 302 over an interconnect 214 by a bus interface 212 of the bridge. Interconnect 214 may be a processor-memory (system) bus.

The TLB is fitted with coherency maintenance apparatus, which in the illustrated embodiment is snoop logic 216. Whenever system bus 214 performs a cacheline access, the cacheline address is checked against table location fields 220 of address mapping entries in the TLB. If a match is found between the bus address and the table location field 220 of any address mapping entry of the TLB, the corresponding entry valid flag is cleared if appropriate for the particular access being performed. The table location field may be implemented as a single or N-way set associative memory, or as a content addressable memory as known in the art.

The table location field 220 of each address mapping of a particular embodiment stores a cacheline address, such that any access that may modify the cacheline matches the address and causes invalidation of the associated TLB entry. In this embodiment, the address tag 200, table location 220, and memory page 222 of a page table entry are all located in the same cacheline, therefore any potentially modifying access to any of these fields invalidates the associated TLB entry.

In an alternative embodiment, a computer system has at least one processor 100 (FIG. 3) which communicates to a memory 102 through a system controller 106. System controller 106 incorporates coherency maintenance logic 108, in a particular embodiment the coherency protocol is directory-based. System controller 106 is also coupled to one, two, or more host channel adapters, such as host channel adapters (HCA) 110 and 112. Host channel adapters 110 and 112 each contain I/O address translation logic incorporating a TLB 114 and 116. Host channel adapters 110 and 112 also may each communicate with one or more Input-Output (I/O) devices, such as a keyboard and mouse interface 118, and one or more intelligent peripheral devices, such as intelligent peripheral 120 and Redundant Array of Independent Disks (RAID) or other disk controller 122. Each intelligent peripheral device has one or more embedded processors 124, memory 126, and peripheral specific controller apparatus 128. In the case of RAID controller 122, peripheral specific controller apparatus 128 may include SCSI controllers 130.

The intelligent peripherals 120 and 122 each couple through a Target Channel Adapter (TCA) 132. TCA 132 incorporates RDMA logic, such that each intelligent peripheral 120 can transfer blocks of data to or from memory 102 in DMA fashion.

In the illustrated embodiment, address translation logic 114 and 116 each contain a Translation Lookaside Buffer (TLB).

Figure 3:
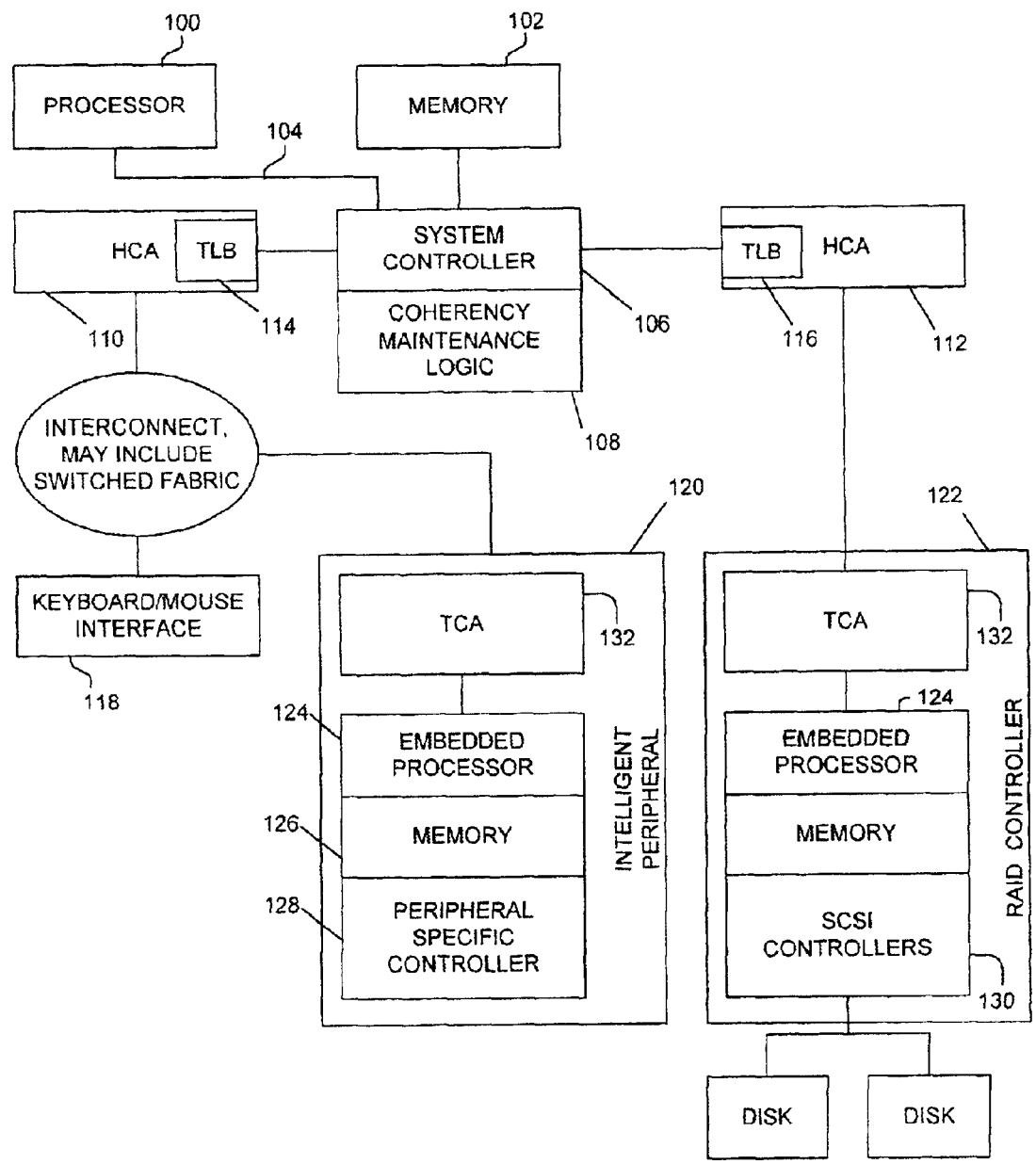
FIG. 3, a block diagram of a system having two intelligent DMA-capable peripheral devices connected through separate host channel adapters (HCAs) coupled to a system controller, wherein address translation logic is located in each HCA, and coherency is maintained using a directory-based protocol.

The TLB 114, 116 of the embodiment of FIG. 3 is very similar to the TLB of FIG. 2, except that snoop logic 216 is replaced by logic that interacts with a cache directory of the system; such that the TLB may acquire and release ownership of cachelines containing page table entries. It is anticipated that the cache directory also manages coherency of processor caches in the system.

It is anticipated that a system having host channel adapters with I/O address mapping hardware could be implemented with a snoop-based coherency maintenance apparatus, and that a system having a host bridge with I/O address mapping hardware could be implemented with a directory-based coherency maintenance apparatus.

While the invention has been particularly shown and described with reference to a preferred embodiment thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A device comprising:
    a first interface to first interconnect apparatus;
    a second interface to second interconnect apparatus, the second interconnect apparatus of a type capable of connection to peripherals having direct memory access apparatus for transferring data;
    the device capable of serving as a bridge for data transfer between the first interface and the second interface; and
    address translation hardware coupled to translate I/O virtual addresses received from the second interface into physical memory addresses for transmission onto the first interface, the address translation hardware further comprising coherency maintenance apparatus wherein the coherency maintenance apparatus maintains coherency by observing the first interface for references to entries of a page table in a memory.

2. The device of claim 1 wherein a valid flag of the address translation hardware is altered when a memory reference having potential to modify a page entry table in memory is observed on the first interconnect apparatus and that page table entry in memory corresponds to an address mapping contained within the address translation hardware.

3. The device of claim 1 wherein the mapping hardware is a translation lookaside buffer.

4. The device of claim 3 wherein the coherency maintenance apparatus maintains coherency by observing the first interface for references to entries of a page table in a memory.

5. The device of claim 3 wherein the coherency maintenance apparatus operates through a directory-based protocol.

6. A bridge comprising:
    a first bus interface;
    mapping hardware for translating an I/O virtual address into a physical memory address;
    the mapping hardware coupled to transmit the physical memory address over the first bus interface;
    wherein the mapping hardware has coherency maintenance apparatus associated therewith;
    wherein the coherency maintenance apparatus is capable of observing traffic on a bus coupled to the first bus interface and altering address mappings stored in the mapping hardware in response to said traffic.

7. A computer system comprising at least one processor;
    at least one memory system;
    coupling apparatus, coupling the at least one processor and the at least one memory system;
    at least one DMA-capable peripheral device coupled to the coupling apparatus;
    at least one address translation apparatus, coupled to translate an I/O virtual address originating with the at least one DMA-capable peripheral device into a physical memory address, the address translation apparatus equipped with coherency maintenance apparatus, and the address translation apparatus is capable of transmitting the physical memory address to the at least one memory system;

wherein the coherency maintenance apparatus is capable of observing traffic on a bus coupled to the first bus interface, and altering address mappings stored in the mapping hardware in response to said traffic.

8. The computer system of claim 7, wherein the coupling apparatus couples to the at least one DMA-capable peripheral device through a host channel adapter and interconnect apparatus.

9. The computer system of claim 7, wherein the coupling apparatus comprises a host bridge and an I/O bus.

10. The computer system of claim 7, further comprising:
   a second processor;
   a second memory system;
   a second host bridge, coupling the second processor and the second memory system to the system bus;
   a second address translation apparatus, coupled to translate an I/O virtual address originating with the at least one DMA-capable peripheral device into a second physical memory address, the second address translation apparatus equipped with coherency maintenance apparatus, and the second address translation apparatus equipped to transmit the second physical memory address to the second memory system.

11. The computer system of claim 7, wherein there are at least two DMA-capable peripheral devices coupled to the coupling apparatus.

12. The computer system of claim 7, wherein the at least one address translation apparatus further comprises a Translation Lookaside Buffer.

13. A computer system comprising
   at least one processor;
   at least one memory system;
   at least one system controller, coupling the at least one processor and the at least one memory system to a host channel adapter;
   at least one peripheral device coupled to the at least one host channel adapter;
   at least one address translation apparatus, coupled to translate an I/O virtual address originating with the at least one peripheral device into a physical memory address, the address translation apparatus equipped with coherency maintenance apparatus, and the address translation apparatus equipped to transmit the physical memory address to the at least one memory system;
   wherein the coherency maintenance apparatus performs a snoop of addresses generated by the at least one processor.

14. The computer system of claim 13, wherein the coherency maintenance apparatus is directory-based.

15. The computer system of claim 14, wherein the coherency maintenance apparatus incorporates a cache directory.

* * * * *